United States Patent [19]

Frei

[11] Patent Number: 4,895,642

[45] Date of Patent: Jan. 23, 1990

[54] PROCESS FOR SEPARATING PARTICLES OF ELECTRICALLY NON-CONDUCTIVE MATERIAL, IN PARTICULAR PLASTICS MATERIAL AND/OR PAPER, FROM WASTE, AND A DEVICE FOR CARRYING OUT THE PROCESS

[75] Inventor: Josef Frei, Oberehrendingen, Switzerland

[73] Assignee: Organ-Faser Technology BV, Haarlem, Netherlands

[21] Appl. No.: 157,494

[22] Filed: Feb. 17, 1988

[30] Foreign Application Priority Data

Feb. 17, 1987 [DE] Fed. Rep. of Germany ....... 3705004

[51] Int. Cl.$^4$ .......................... B03C 3/01; B03C 3/38; B03C 3/88
[52] U.S. Cl. ................................. 209/127.3; 209/129; 209/930; 209/3; 241/79.1
[58] Field of Search .......................... 209/127.1–127.3, 209/129, 1–3, 930–931, 12, 20; 241/DIG. 38, 79.1

[56] References Cited

U.S. PATENT DOCUMENTS

| | | | |
|---|---|---|---|
| 2,815,860 | 12/1957 | Krantz et al. | 209/20 |
| 3,308,944 | 3/1967 | Chamberlain et al. | 209/129 |
| 3,402,814 | 9/1968 | Morel et al. | 209/127.1 |
| 3,476,243 | 11/1969 | Ferrara | 209/129 |
| 3,897,215 | 7/1975 | Davidson, Jr. et al. | 209/12 |
| 4,387,019 | 6/1983 | Dale et al. | 209/930 |
| 4,410,347 | 10/1983 | Krumwiede | 209/129 |
| 4,746,073 | 5/1988 | Stone et al. | 209/127.1 |

FOREIGN PATENT DOCUMENTS

| | | |
|---|---|---|
| 3105597 | 10/1985 | Fed. Rep. of Germany . |
| 3614324 | 10/1987 | Fed. Rep. of Germany . |
| 3614325 | 10/1987 | Fed. Rep. of Germany . |

Primary Examiner—Joseph J. Rolla
Assistant Examiner—Steven Reiss
Attorney, Agent, or Firm—Scully, Scott, Murphy & Presser

[57] ABSTRACT

A process for separating particles of electrically non-conductive material, especially plastics material and/or paper, from waste, in which before separation the waste may be prepared by comminution, dehydration and/or loosening up, it is to be further developed so that the particles of non-conductive material can be removed simply and economically. This is achieved by subjecting the waste, as a heterogeneous stream of material of limited particle size, at a first station to a treatment which electrostatically charges the particles of non-conductive material and at a subsequent second station extracting the electrostatically charged particles, in the fluidized or suspended state of the stream of material, from the stream of material by means of at least one receiver of opposite electrostatic charge.

9 Claims, 1 Drawing Sheet

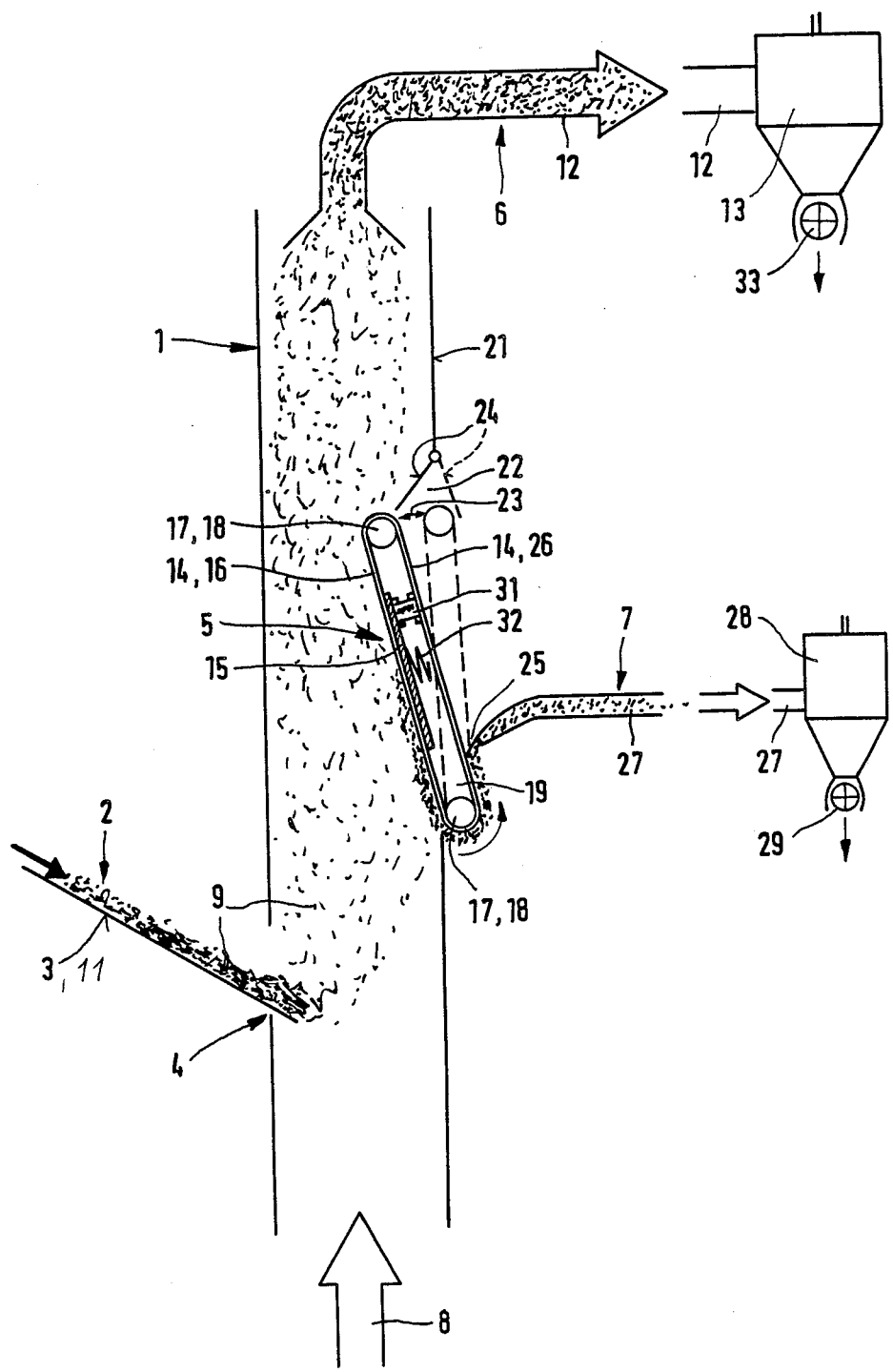

PROCESS FOR SEPARATING PARTICLES OF ELECTRICALLY NON-CONDUCTIVE MATERIAL, IN PARTICULAR PLASTICS MATERIAL AND/OR PAPER, FROM WASTE, AND A DEVICE FOR CARRYING OUT THE PROCESS

BACKGROUND OF THE INVENTION AND PRIOR ART

It is known that by various processes household, trade and also industrial refuse or waste can be sorted into several fractions and worked up into usable crude or raw materials.

According to each of the German Pat. No. 31 05 597 and the German Patent Application Nos. P 36 14 324.3 and P 36 14 325.1 of the applicant, the waste is divided into three main fractions, such as ferrous metals
granulated dense materials (dense fraction) and
light fraction (fibrous materials).

The latter consists of organic, compostable or combustible constituents such as paper, wood, textiles, plants, etc., mixed with particles of plastics material, especially plastics material foils, that can be made airborne.

On the one hand, plastics material is a material that interferes with subsequent treatment:

In the case of composting, since the plastics material mainly present does not rot.
In the case of burning, as plastics material releases heavy metals and chloride.
In the case of the manufacture of compacts, which are manufactured under pressure, as, particularly when plastics material foils are present, the stability of the compacts is impaired.

On the other hand plastics material is a material that can be added in subsequent treatment, especially when it is a thermoplastic such as polyethylene.

A separating process is already known in which plastics material and paper are separated by means of water, with which the mass to be separated is sprayed until the absorbent paper fibres or particles are saturated and exhibit a higher density than the plastics material particles, especially plastics material foils. Subsequently the particles are separated from one another in a wind channel. After separation the fractions have to be dried. This process has the following disadvantages:

Because of the moistening with water the particles often cling (stick) tightly to one another, whereby separation is prevented.
High water utilization.
Dirty water results which has to be purified.
Relatively high energy utilization.

It has also already become known to remove plastics material particles by hand, after optical examination, from waste which is supplied as a stream of material. This process is very time consuming as well as involving high labor costs, and becomes more difficult to carry out as the size of the plastics material particles decreases.

OBJECT OF THE INVENTION

The object of the invention is to improve the above-mentioned process and the above-mentioned device so that particles of non-conductive material can be removed from waste simply and economically.

BRIEF DESCRIPTION OF THE INVENTION

The invention is based on the realization that non-conductive materials, in particular plastics material, are electrostatically chargeable, and makes use of the attractive force that exists, as a result of the electrostatic charge of the particles and the attractive force from the opposite electrostatic charge of a receiver, in order to extract the particles of non-conductive material from the stream of material, preferably transverse to the stream of material. The effectiveness of the separating forces is relatively large, as in the fluidized or suspended state the particles to be separated put up little resistance to these separating forces and are therefore easier to extract from the stream of material. With the invention the waste can, in the desired way, be continuously and economically fractionated simply and with little expenditure of energy. The process according to the invention is particularly suitable for small particles which can be extracted from the stream of material with relatively weak forces.

The electrostatic charge of the particles of non-conductive material can be produced by friction or by friction and separation of the particles to be charged against and from one another and/or the carrier that holds them. Friction can be generated in an advantageous way by supplying the waste in a vibrating or shaking chute.

The fluidized or suspended state can be achieved in a simple way by passing the stream of material through a flotation zone, in which the force of gravity on the particles, and thus also the pressure of the particles on one another, is substantially reduced. Preferably suitable for this is the passage of the stream of material through an air stream, which is preferably directed upwards and can be so strong that the particles are not only fluidized or brought into a state of suspension but can also be transported with the air stream, i.e. the air stream can at least partially take over conveyance of the stream of material.

The process according to the invention is particularly suitable for a stream of waste material that has already been prepared by a separating pretreatment, e.g. by separation into a light and a dense fraction or a light, a middle and a dense fraction, the suitability applying particularly to the light and/or middle fraction as the light particles can be separated more effectively from the stream of material by the process according to the invention.

The device enables the process according to the invention to be carried out by simple and practical means which, by a simple function, make good separating results possible. As already with the process according to the invention, the arrangement according to the invention is based on the appreciation that the waste particles of non-conductive material can be electrostatically charged and because of this charge can be extracted from the stream of material by an oppositely charged receiver.

For individual advantages reference is made to the description of advantages of the features of the process according to the invention.

BRIEF DESCRIPTION OF THE DRAWINGS

The invention will now be described in more detail with reference to preferred exemplary embodiments shown in a simplified drawing. The drawing shows in vertical section a device designed according to the invention for separating particles of electrically non-conductive material, in particular plastics material and/or paper, from waste.

DETAILED DESCRIPTION OF PREFERRED EMBODIMENTS OF THE INVENTION

The essential parts of the device are a vertical shaft 1, e.g. a tube of round or rectangular or, as the case may be, square cross-section, a feed device 2 for waste in the form of an inclined chute 3 which leads into the lower region of the shaft 1, at 4 in the region of an opening therein, a receiving device 5 arranged above the opening 4 for particles of electrically non-conductive material of the waste, two removal devices 6, 7 for waste particles, of which the first is arranged in the upper region of the shaft 1 and the second is associated with the receiving device 5, and a blower (not shown) which produces an upwardly directed stream of air in the shaft 1, as indicated by the arrow 8.

The feed device 2 comprises a vibrating or shaking chute which when the device is in operation transmits its vibrations to the stream of material 9 flowing in the chute 3 to the shaft 1, whereby the particles of the stream of material rub both against one another as well as against the chute 3, and as a result the particles of electrically non-conductive material, particularly the plastics material particles, receive a certain electrostatic charge. The chute 3 thus forms not only a feed device but also an arrangement 11 for electrostatically charging the particles of electrically non-conductive material contained in the stream of material 9. The first removal device 6 comprises a pipe 12, leading out of the upper end of the shaft 1, which leads to a separator 13 such as a cyclone.

The receiving device 5 comprises a rotating belt 14, which in the present exemplary embodiment runs longitudinally of the shaft 1, preferably made of plastics material, which, whilst rotating, rubs against a plate-like friction member 15, preferably of copper. The conveying span 16 of the belt 14 preferably runs counter to the air stream 8. The friction member 15 is preferably arranged between the spans of the belt 14, namely on the side that faces away from the stream of material 9 of the span 16 that faces the stream of material. The belt 14 runs around two rollers 18 that rotate about axes of rotation 17 running transverse to the axis of the shaft and are mounted in a frame 19, not shown in detail. The drive is not shown, for reasons of simplification. The receiving device 5 engages through the wall 21 of the shaft 1 in a wall opening 22 and is displaceable transverse to the shaft axis 1 and can be fixed securely in any particular position.

In the present exemplary embodiment the receiving device 5 can be pivoted about its lower end, e.g. about the lower axis of rotation 17, and can be secured in any particular angular position: in a preferred position, it projects diagonally upwards into the cross-section of the shaft. A second position of the receiving device 5, in which it extends almost parallel to the wall 21 or projects only slightly into the shaft, is indicated in partial outline. The displacement region is indicated by the double arrow 23. For the purpose of sealing the upper end of the receiving device 5, of which the position relative to the wall 21 changes, a pivotable hinged flap 24 is mounted on the upper boundary of the wall opening 22. Further sealing elements to seal the receiving device 5 in the wall opening 22 are for reasons of simplification not shown.

Associated with the belt 14 outside the shaft 1 is a stripping device 25 having a stripping edge which cooperates with the outside of the belt 14. In the present exemplary embodiment the stripper 25 is arranged on the outside of the outer span 26. Joined to the stripper 25 is a pipe 27 forming the second removal device 7 which leads to a second separator 28 such as a cyclone.

The operation of the separating device will be now described.

Prepared waste, i.e. if necessary comminuted, dried and loosened up or homogenized waste is fed via the feed device 2 to the shaft 1. The dryness of the waste or the waste particles is of importance, because at least the surfaces should be dry as otherwise surface adhesion could occur between the particles to be separated. The size of the waste particles should preferably be smaller than 2×2 cm edge length.

The preparation of the waste described above is preferably done according to the German Pat. No. 31 05 597.

During the feeding of the stream of material 9 in the feed device 2 frictional stress results from the movement of the material due to the back and forth movement of the chute 3, which brings about electrostatic charging, especially of the plastics material particles. At the mouth 4 of the chute 3 the stream of material 9 arrives in the shaft 1, whereby a flaky, fibrous and/or lamina-like light fraction of fibers, paper and plastics material, in particular plastics material foils, floats up due to the upwardly directed air stream 8, whilst a fraction of dense materials falls down in the shaft 1. The speed of the air stream 8 should be adjusted accordingly, and so far as possible so that the speed or the movement of the light fraction floating upwards is slight. By means of the upwardly directed air stream 8 the light fraction is loosened up and reaches the region of the receiving device 5 which forms a voltage or potential sector having an electrostatic charge which firstly is opposite to the polarity of the charge of the plastics material particles and secondly, due to the electrostatic force acting under these conditions, extracts the plastics material particles from the stream of material 9. The plastics material particles stick to the receiving part, here the belt 14, and are transported to the second removal device 7. In the present exemplary embodiment the plastics material particles, which are mainly pieces of plastics material foil, are stripped off of the belt 14 by means of the stripper 25 and directed into the pipe 27. In the separator 28 the plastics material fraction is separated and, as the case may be, collected and, by means of a selecting device 29, is fed to the use for which it is intended.

The electrostatic charge of the voltage or potential sector formed by the receiving device 5 is preferably variable: in the present exemplary embodiment it can be adjusted by a setting or tensioning device 31, by means of which the pressure between the friction member 15, which is preferably in the form of a plate, and the belt 14 can be varied. This object can be achieved by the tensioning device 31 and/or also a spring 32 which urges the friction member 15 against the belt 14.

The light fraction, especially of paper, flakes and fibres whose particles are not, or are less strongly, electrostatically charged and therefore not attracted to the receiving device 5, arrives with the air stream 8 in the separator 13 in which it is separated from the air stream and, as the case may be, collected and, by means of a second selecting device 33, fed to the use for which it is intended Within the scope of the invention it is possible to arrange several receivers one behind the another in the direction of the air stream 8, whereby effective separation of the particles to be separated and/or separation of particles of different materials (e.g. plastics material and paper) is possible by means of electrostatic forces of varying strengths.

What is claimed is:

1. A device for separating particles of electrically non-conductive material such as plastics and paper from waste, having a feed device for feeding a stream of fractionated waste material into said shaft, comprising a first station provided with a device for electrostatically charging the particles of electrically non-conductive material in the stream of material and a subsequent second station provided with a receiving device of an opposite electrostatic charge, wherein said receiving device comprises a rotating conveying element which projects into or laterally borders the shaft or the stream of material, said conveying element further comprising a conveyor belt which is displaceable such as by pivoting, transverse to the shaft or to the stream of material.

2. A device according to claim 1, wherein a fluidized bed or a flotation zone for the stream of material is provided in the region of the second station.

3. A device according to claim 2 wherein the stream of material is exposed in the region of the flotation zone to an air stream, 4. A device according to claim 3, wherein the air stream is directed upwards.

5. A device according to claim 1, wherein the feed device comprises a vibrating or shaking chute.

6. A device according to claim 1, wherein the second station is arranged above the first station.

7. A device according to claim 1, wherein the conveying element has a friction element associated with it, on which the conveying element slides when in operation.

8. A device according to claim 1, wherein the receiver has associated with it a removal device preferably in the form of a pneumatic conveyor.

9. A device according to claim 1, wherein a second removal device, preferably in the form of a pneumatic conveyor, is arranged above the second station.

* * * * *